350-276 CROSS REFERENCE SEARCH ROOM

Jan. 29, 1957 M. J. PIFER 2,779,938

SURROUND LIGHTING STRUCTURE FOR IMAGE SCREEN OF CATHODE RAY TUBE

Filed June 2, 1952

INVENTOR
MARION J. PIFER
BY John A. Harvey
ATTORNEY

United States Patent Office 2,779,938

Patented Jan. 29, 1957

2,779,938

SURROUND LIGHTING STRUCTURE FOR IMAGE SCREEN OF CATHODE RAY TUBE

Marion J. Pifer, Williamsville, N. Y., assignor to Sylvania Electric Products Inc., a corporation of Massachusetts Application June 2, 1952, Serial No. 291,123

8 Claims. (Cl. 340—369)

The present invention relates to surround-lighting structures for television receivers, and more particularly to a surround-lighting structure suitable for incorporation as a unitary structure into the receiver.

It has been found in practice that eye fatigue and eye strain is often experienced when observing, over prolonged periods, images reproduced by television receivers. It has been proposed that such fatigue and eye strain be reduced by increasing the average intensity of the reproduced image so that the latter can be satisfactorily viewed in a moderately lighted room. This, however, has not proven entirely satisfactory for reasons to be pointed out hereinafter.

There have also been proposals that the image area of a receiver be surrounded by a frame having a concave cross-sectional configuration and a light-reflecting surface to receive incident light from the television screen and reflect it outwardly to an observer. This is a form of immediate surround lighting wherein the intensity of the surround lighting varies in proportion to the average brightness of the reproduced image. This has the disadvantage, of course, that the frame with its light-reflecting surfaces must extend well forwardly of the image screen, and the frame structure thus becomes large and unwieldly and undesirably reduces the angle over which observers may view the television screen. Another form of immediate surround lighting heretofore proposed illuminates the front surface of the television cabinet from a distributed source of light surrounding the image reproducing area of the receiver, or edge lights a glass panel which covers the front of the cabinet and has a light diffusing frosted surface. The arrangement last mentioned is difficult to use satisfactorily in practice, is relatively costly, and does not lend itself readily to cabinet styling considerations.

It is an object of the present invention to provide a novel surround-lighting structure assuring better viewing conditions for television pictures.

It is a further object of the invention to provide a surround-lighting structure in which the surround lighting is substantially free of pattern and may be chromatically matched to the color characteristics of the picture produced by the television receiver.

It is an additional object of the invention to provide a unitary surround-lighting structure of simple, compact and relatively inexpensive construction and one which enhances television cabinet styling.

The above objections and advantages will become more readily apparent upon considering the following detailed description taken in conjunction with the accompanying drawing wherein.

Figure 2:
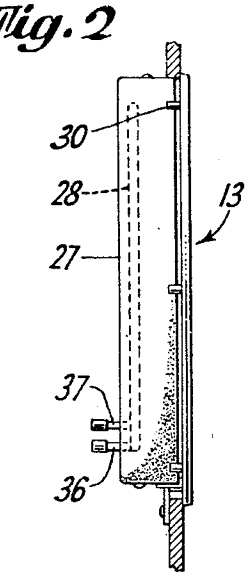
Fig. 2 is a side elevational view taken from the left of Fig. 1.
Figure 1:
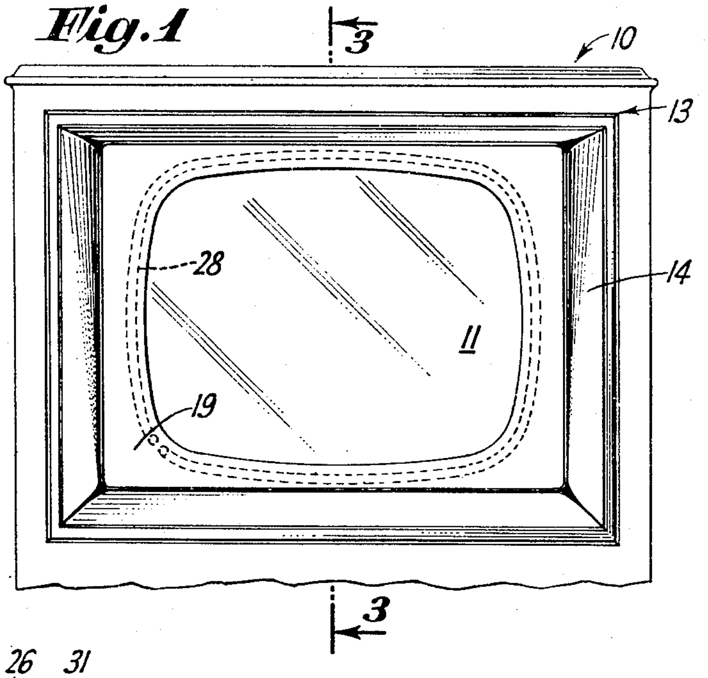
Fig. 1 is a front elevational view of an illustrative form of a television receiver surround-lighting structure embodying the present invention.

The fovea of the human eye, which is devoted to conscious seeing of detail, covers only a small central region of the total retinal area. This region is commonly referred to as the field of exact vision and is approximately defined as the one degree angle subtended by the fovea. An object lying wholly within the exact field of vision is designated as the "task" and can be seen distinctly at one time. When viewing an object subtending an angle greater than one degree, the eye without realized effort moves rapidly from one part of the object to another in order successively to bring the entire object into the exact field of vision. Although conscious seeing is limited to the fovea, the remainder of the total retinal area, referred to as the perifoveal region, is of importance when considering the ease of viewing.

There are a number of factors for determining whether the human eye is used under optimum conditions of sight, as for example when viewing television pictures. An important factor is visual acuity, which may be defined as the reciprocal of the just resolvable angle measured in minutes of arc, and is the ability to perceive the interspace between two extremely close objects. This factor is affected both by contrast and intensity of illumination or brightness. Contrast is the ratio of the brightness of the object to its background. Since visual acuity is improved by increasing the illumination up to a certain point, a high ratio of contrast is desirable, keeping in mind that too great a variation in contrast is displeasing to the eye. Brightness is a measure of the illumination of the image of the object formed on the retina of the eye. An increase in brightness favorably influences visual acuity and is advantageous. However, as the brightness increases the stimulation to the eye increases proportionately thus tending to cause more rapid eye fatigue. Further, outside of the fovea of the eye, that is in the perifoveal region of the retina, the eye is more sensitive to low levels of illumination than in the fovea. In fact, a decided decrease in contrast sensitivity is obtained when when the perifovel region is stimulated by too bright a field, a condition usually referred to as "glare." It follows that within the task, contrast is an aid to vision, whereas outside the task, contrast hinders comfortable viewing.

From the foregoing, it is apparent that the intricacies of design and function of the human eye complicate the problem of arriving at optimum values for the various controlling factors in order to minimize eye fatigue and eye strain when observing images reproduced by a television receiver. This problem is further complicated by the interaction that takes place between the foveal and the surrounding perifoveal regions. Reduced to a summary of ultimate result, the interaction process of the perifoveal region tends automatically to move the fovea away from a dark zone toward a brighter zone. For example, in viewing a television picture the fovea normally moves from one area to another to explore the entire picture, but as the fovea approaches the borders of a relatively bright picture having a dark surround the movement of the fovea is counteracted by the interaction process and this causes the viewer unknowingly to tend to return his view to the more comfortably viewable central area of the picture. Thus the viewer unconsciously tends to "stare," resulting in discomfort and eye strain.

Referring now to the drawings, there is shown a portion of the front panel a television receiver cabinet 10.

The panel is apertured to receive the unitary surround lighting structure of the present invention and to expose the image reproducing screen 11 of the picture tube mounted within the receiver cabinet.

The surround lighting structure includes a die cast zinc frame or bezel 13 having inner reentrant front face portions 14 terminating in an inclined planar surface 15 as shown. The frame 13 is also provided with outer reentrant front face portions 16 which terminate in a vertical planar surface corresponding to the front face of the cabinet 10. It is readily apparent that the frame 13 may be constructed to contribute to the styling of the cabinet.

The surround lighting structure also includes rearwardly of the frame 13 a protective window glass 18 and a light-diffusing translucent mask 19 centrally apertured to expose the image screen 11 of the picture tube. The forward surface of the mask 19 preferably is of an off-white color and a matte finish.

The top and bottom edges of the protective window glass 18, which preferably is of conventional safety-glass construction and of the light diffusing mask 19 are clamped together by elongated metallic gripping members 21 which have U-shaped cross-sections and are covered by fabric 22 to minimize breakage of the glass window during assembly and transportation and to insure a rattle-proof construction. The frame 13 includes a number of spaced apart rearwardly projecting lugs 20 along its upper and lower edges, and the window glass and mask assembly is secured in place on seats 23 of the lugs 20 by means of suitable metallic clips 24 and machine screws 25.

Secured to the gripping members 21 are metallic bracket 26 for affixing to the assembly last described the additional sub-assembly of a relatively flexible light housing 27 and distributed light source 28. The housing 27 encloses the light-diffusing mask 19, has a central aperture to expose the image screen 11 of the picture tube, and its forward edge terminates adjacent to but spaced from the rearmost edge of the outer reentrant portions 16 of the frame 13 by a distance approximately equal to the thickness of the front panel of the receiver cabinet 10.

The housing 27 is fabricated of any suitable material, for example a moulded or formed plastic, and is provided on its outer surfaces with a conductive coating of a colloidal graphite in a suitable vehicle such as the product sold under the trade name "Aquadag." Accordingly the housing 27 provides an electrostatic shield for minimizing the effect of any high-frequency interference, which may be developed by the distributed light source 28, on the operation of the associated television receiver. A conductive connector may ground the conductive coating of the housing 27 to the chassis of the receiver to enhance the shielding action. Additionally, the graphite coating is opaque and thus provides a light shield to prevent random light from within the television receiver from undesirably falling upon the light diffusing mask 19. The inner surfaces of the housing 27 are light colored to reflect incident light toward the mask 19.

As clearly shown in Fig. 2, the frame 13 is provided with integral studs 30 into which machine screws (not shown) are threaded for securing clips (also not shown) which engage the rear face of the cabinet 10 to secure the surround lighting structures in the apertured front panel of the cabinet.

Figure 3:
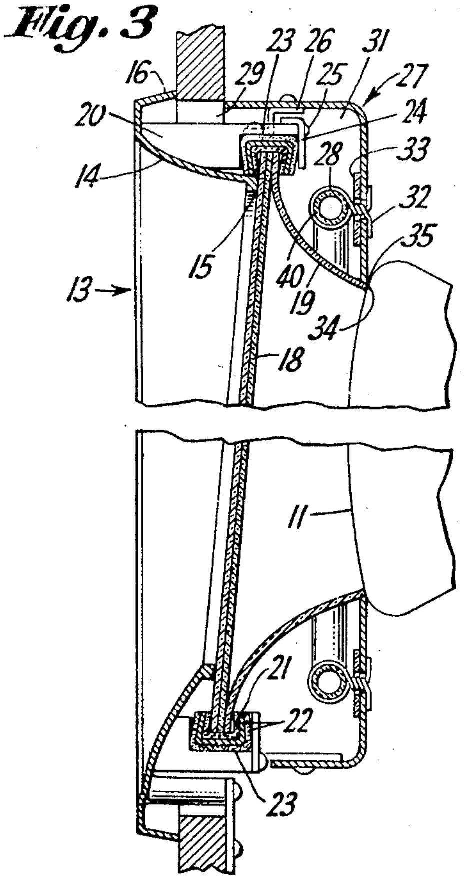
Fig. 3 is an enlarged sectional view, partially broken away, along the plane 3—3 of Fig. 1.

Preferably the distributed light source 28 is a conventional neon or fluorescent lamp filled with one or more insert gases. This lamp is mounted within the housing 27 by spaced wires 32 and insulating spacer members 33. As clearly illustrated in Fig. 3, the light source 28 is behind the mask 19, the latter having its aperture edges 34 terminating adjacent to the image-screen 11 of the picture tube, which is received within the complementary aperture 35 of the housing 27. Accordingly, when the mask 19 is illuminated by the distributed light source 28 surround lighting is provided for the image-screen.

Figure 4:
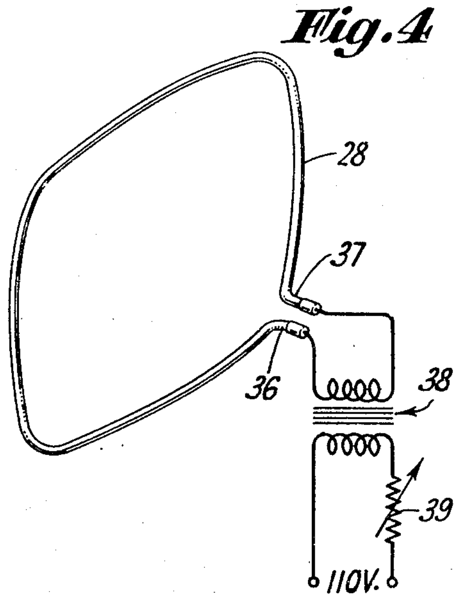
Fig. 4 is a fragmentary perspective view of a distributed light source, and the electrical energizing circuit therefore, for producing surround lighting of predetermined intensity suitable for use in the Fig. 1 embodiment.

Referring now to Fig. 4, there is shown the distributed light source 28 which has its input terminals 36, 37 connected across the secondary winding of a high-voltage transformer 38 which is constructed to have poor regulation and has its primary winding connected to a power line or the like through a series connected variable resistor 39. As is apparent to one skilled in the art, variations of the impedance of the series-connected resistor 39 permit control of the intensity of illumination of the light diffusing mask 19 by source 28.

Any suitable means may be provided for chromatically matching the color of the surround lighting with the color characteristics of the image screen 11 of the picture tube. In the illustrative embodiment, the exterior surface of the light source 28 is provided with a coating constituting a final light color filter 40. This filter is selected such that after the light passes through the filter 40 and the mask 19 (likewise having a particular color transmission characteristic), the surround lighting produced is chromatically matched to the color characteristics of the picture tube. The desired chromatic match may be achieved in numerous other ways as, for example, by controlling the color of the initial light produced by the light source 28, or by varying the color transmission characteristics of the light diffusing mask 19, or both.

In operation, the distributed light source 28 may be energized whenever the television receiver is turned on. The light diffusing mask 19 is illuminated by the light source 28 to provide a surround illumination framing the image reproduced by the screen 11. This surround lighting is of a width determined by the size of the mask 19 and permits a substantial increase in the area of comfortable foveal movement to give the viewer the feeling of looking at a much larger picture and to observe substantially all portions of the picture without strain.

Optimum viewing conditions are achieved by correlating the brightness of the surround lighting to be equal to or slightly less than the average picture brightness. This can be readily accomplished by varying the value of the series-connected resistance 39 which may be controlled from the instrument panel of the television receiver. Due to the chromatic matching of the color of the surround lighting with the color of the image reproduced by the picture tube, the surround lighting appears to be an effective extension of the image area.

It will be apparent from the foregoing description of the invention that a surround-lighting structure embodying the invention enhances the perifoveal stimulation required by the eye for greatest sensitivity, visual acuity and comfort of viewing, and is one wherein the extent of the area of surround illumination may be easily and readily selected and controlled by design as desired. At the same time, the surround-lighting structure of the invention involves only a relatively simple and inexpensive construction yet is one having a pleasing appearance and high effectiveness in reducing eye discomfort of the observer over prolonged periods of observation. The surround-lighting structure of the invention additionally facilitates the attainment of desired high intensity of the reproduced image and good contrast within the task to aid vision, yet minimizes contrast outside of the task which otherwise would hinder good vision. It thus greatly minimizes unpleasant physiological and psychological effects heretofore frequently experienced by an observer in prolonged viewing of the reproduced image of a television receiver.

While there have been described what are at present considered to be the preferred embodiments of the invention, it will be apparent to those skilled in the art that various changes and modifications may be made therein without departing from the invention. Consequently, the appended claims should be interpreted broadly, as may be consistent with the spirit and scope of the invention.

What I claim is:

1. An integral surround-lighting structure for the image screen of a television-receiver comprising a decorative frame adapted to surround said image screen but spaced by substantial margins from the image-reproducing area thereof, a light-diffusing translucent mask carried by said frame and positioned to provide a continuous margin around said image screen from the edges of said reproducing area to said frame, and a distributed light source arranged rearwardly of said mask and supported by said structure for relatively uniform illumination of said mask.

2. An integral surround-lighting structure for the image screen of a television receiver comprising a decorative frame adapted to surround said image screen but spaced by substantial margins from the image-reproducing area thereof, a light diffusing translucent mask integral with said frame and positioned to provide a continuous margin around said image screen from the edges of said reproducing area to said frame, a distributed light source arranged rearwardly of said mask and supported by said frame for relatively uniform illumination of said mask, and a protective transparent member supported by said frame and closing the window provided thereby.

3. An integral surround-lighting structure for the image screen of a television receiver comprising a supporting frame adapted to be positioned adjacent to and substantially surrounding said image screen but spaced therefrom by a wide margin, a light-diffusing translucent mask carried by said frame to provide a wide margin surrounding said image screen and extending from the edges thereof to said frame, a distributed light source carried by said frame to relatively uniformly illuminate said mask and thereby provide surround lighting of said image screen, and an enclosing member having an opaque electrically conductive surface positioned about said light source to provide both an electrical-interference shield therefor and a light shield effective to prevent random light originating within said television receiver from falling upon said mask.

4. An integral surround-lighting structure for the image screen of a television receiver comprising a decorative frame adapted to surround said image screen but spaced therefrom by a substantial margin, a light diffusing translucent mask carried by said frame and positioned to provide a continuous margin surrounding said image screen from the edges thereof to said frame, a distributed light source supported by said structure and positioned substantially uniformly to illuminate said mask and thereby provide surround lighting for said image screen, and means for effectively chromatically matching the color of said surround lighting with the color characteristics of the image reproduced by said image screen.

5. An integral surround-lighting structure for the image screen of a television receiver comprising a frame adapted decoratively to frame said image screen but with a relatively wide margin between said screen and said frame, a light-diffusing translucent mask supported by said frame to fill the marginal space between said frame and said screen, a light source supported by said structure substantially uniformly to illuminate said mask from the rear thereof for surrounding said image screen with luminous energy, and means for adjustably controlling the intensity and for establishing the color of said light source to render said luminous energy after transmission through said mask approximately equal in intensity and color to the average luminous intensity and color of an image reproduced at any selected time on said image screen.

6. A surround-lighting structure for the picture tube of a television receiver having an enclosing cabinet comprising a frame adapted to be supported within an aperture of said cabinet forwardly of and surrounding the image screen of said picture tube but with a margin between said frame and screen, said frame having a front face arranged in a substantially vertical plane and having a rear face arranged in a downwardly and forwardly inclined plane, a protective transparent safety glass closing the opening in said frame and having its marginal edges in abutment with said rear face, a light-diffusing translucent mask having its outer margin in abutment with the marginal edge of said safety glass and having its inner margin in engagement with said tube and framing the image screen thereof, means carried by said frame for rigidly affixing said glass and mask to said frame, and a distributed light source arranged rearwardly of said mask and integral with said frame for uniformly illuminating said mask.

7. A surround-lighting structure for the picture tube of a television receiver having a cabinet comprising, a frame mountable within an aperture of said television cabinet forwardly of and surrounding the image screen of said picture tube but separated from said screen by a relatively wide margin, a protective transparent window traversing said frame rearwardly thereof and integral therewith, a housing member spaced rearwardly of said window and integral with said frame, said housing member being formed with a central aperture shaped to conformably receive said picture tube, a light-diffusing translucent mask integral with said frame and flaring inwardly and rearwardly from the edges of said window to a central aperture in said mask which frames said image screen, and a distributed light source supported by and within said housing member rearwardly of said mask for uniformly illuminating said mask to provide surround lighting immediately adjacent said image screen.

8. An integral surround-lighting structure for the image screen of a television receiver comprising a decorative frame adapted to surround said image screen but spaced by substantial margins from the image reproducing area thereof, a light-diffusing translucent mask carried by said frame and positioned to provide a continuous margin around said image screen from the edges of said reproducing area to said frame, said mask being centrally apertured to expose said image screen to direct view and having peripheral portions which in cross section have a curvilinear contour, and a distributed light source supported by said structure rearwardly of said mask and positioned substantially to coincide with the axes of curvature of said mask portions to provide relatively uniform illumination of said mask.

References Cited in the file of this patent

UNITED STATES PATENTS

| | | |
|---|---|---|
| 2,298,870 | Cooper | Oct. 13, 1942 |
| 2,499,063 | Hammer | Feb. 28, 1950 |
| 2,529,713 | Thurston | Nov. 14, 1950 |
| 2,579,230 | Giboney | Dec. 18, 1951 |
| 2,598,072 | Rose | May 27, 1952 |
| 2,618,695 | Ackerman | Nov. 18, 1952 |
| 2,665,419 | Van Orden | Jan. 5, 1954 |
| 2,669,708 | DuMont | Feb. 16, 1954 |

OTHER REFERENCES

Bedford, Abstract Ser. No. 83,652, filed March 26, 1949; published February 20, 1951.